United States Patent [19]
Bae

[11] Patent Number: 5,806,635
[45] Date of Patent: Sep. 15, 1998

[54] FRICTION BRAKE SYSTEM FOR A VEHICLE

[75] Inventor: Gyu Tae Bae, Ulsan-si, Rep. of Korea

[73] Assignee: Hyundai Motor Company, Ltd.

[21] Appl. No.: 653,349

[22] Filed: May 24, 1996

[30] Foreign Application Priority Data

May 24, 1995 [KR] Rep. of Korea .................. 1995 12986

[51] Int. Cl.⁶ ................................................. F16D 65/24
[52] U.S. Cl. ..................................... 188/106 F; 188/79.62
[58] Field of Search ............................ 188/79.61, 79.64,
188/205 R, 205 A, 196 BA, 196 D, 106 F,
106 A, 325, 329, 330, 332, 79.54; 192/83,
85 AT, 4 A, 111 A; 74/107, 110

[56] References Cited

U.S. PATENT DOCUMENTS

| | | | |
|---|---|---|---|
| 1,808,079 | 6/1931 | Seddon et al. ......................... | 188/79.62 |
| 1,866,481 | 7/1932 | Norton ..................................... | 188/329 |
| 2,049,628 | 8/1936 | Rowland et al. ........................ | 188/330 |
| 2,106,167 | 1/1938 | Colman .................................. | 188/79.51 |
| 2,234,689 | 3/1941 | Chaud .................................... | 188/79.62 |
| 2,313,432 | 3/1943 | Goepfrich ............................... | 188/106 A |
| 3,372,775 | 3/1968 | Beller et al. ...................... | 188/196 BA |
| 3,482,665 | 12/1969 | Meier ................................ | 188/196 BA |
| 3,809,191 | 5/1974 | Woodward ........................... | 188/106 A |
| 4,184,571 | 1/1980 | Karasudani ......................... | 188/106 F |
| 4,369,863 | 1/1983 | Farr et al. ............................. | 188/106 F |
| 4,981,200 | 1/1991 | Gee ......................................... | 188/329 |

FOREIGN PATENT DOCUMENTS

| | | | |
|---|---|---|---|
| 0049085 | 4/1982 | European Pat. Off. ............ | 188/79.62 |
| 0456238 | 11/1936 | United Kingdom ................ | 188/79.62 |

Primary Examiner—Chris Schwartz

[57] ABSTRACT

A brake system includes a pair of brake shoes and a wheel cylinder actuating the brake shoes such that the brake shoes contact a drum to apply braking action thereto. The wheel cylinder includes a housing, a first pair of oppositely facing pistons disposed within the housing, and a second pair of oppositely facing pistons disposed within the housing between the first pair of oppositely facing pistons. When the brake is operated, hydraulic pressure causes the second pair of pistons to move outward in opposite directions. As a result, the first pair of pistons move outward in opposite directions. Since the brake shoes are connected to the first pair of oppositely facing pistons, the brake shoes are applied to the drum. The wheel cylinder further includes a member disposed between and in contact with the second pair of oppositely facing pistons. In a first position the member provides a first separation distance between the second pair of oppositely facing pistons, and in a second position the member provides a second separation distance, longer than the first separation distance, between the second pair of oppositely facing pistons. By moving the member from the first position to the second position the brake shoes will be applied to the drum. In this manner, a parking braking can be applied.

11 Claims, 2 Drawing Sheets

FRICTION BRAKE SYSTEM FOR A VEHICLE

BACKGROUND OF THE INVENTION

1. Field of the Invention

The present invention is related to a friction brake system for a vehicle, and more particularly to an improved brake system having an improved wheel cylinder which performs a parking brake function and is simple in structure and inexpensive to manufacture.

2. Description of Related Art

Various types of friction brake systems are known in the art. Generally, the brake system is installed on wheels for reducing speed of a vehicle and stopping a vehicle. Brake systems include two types of brakes: a disc brake, and a drum brake.

As shown in FIG. 1, the conventional drum brake includes a drum 1, a pair of brake shoes 3 rotatably connected to a shoe hinge 2 which is fixed to a lower portion of a brake plate 17, a pair of brake linings 4 fixed to the pair of brake shoes 3 for operatively contacting a bore surface of the drum 1, a wheel cylinder 10 operated by a brake pedal (not shown) for causing the pair of brake shoes 3 to contact the bore surface of the drum 1 by rotating the pair of brake shoes 3 towards the bore surface of the drum 1, and a return spring 5 connected between the pair of brake shoes 3.

Also, the wheel cylinder 10, as shown in FIG. 2, includes a housing 11, a pair of pistons 12 facing each other (i.e., oppositely facing pistons), a seal 13 disposed on each facing surface of the pistons 12, and a second return spring 14 disposed between the seals 13.

The conventional brake system operates as follows. When the driver pushes the brake pedal in order to stop the vehicle or reduce the speed of the vehicle, oil enters the housing 11 through an orifice 15 of the wheel cylinder 10. At this time, hydraulic fluid pressure generated by the oil in the housing 11 pushes the pair of pistons 12 in opposite directions. The pair of pistons 12 push a corresponding pair of push rods 6 fixed to an upper portion of the brake shoes 3, respectively, so that the brake shoes 3 rotate about the shoe hinge 2. As a result of the rotation of the brake shoes 3, the brake linings 4 contact the bore surface of the drum 1 so that the friction force generated by contact of the brake linings 4 to the bore surface provides a braking action.

In this conventional brake system, there is also a parking brake system for putting on the brake during parking of a vehicle. The parking brake system, as shown in FIG. 1, includes a rotatable lever 8 for rotating about a hinge pin 7 disposed on an upper end of one brake shoe 3, an adjuster 9 located between the rotatable lever 8 and the other brake shoe 3, and a cable 16 for operating the rotatable lever 8 according to operation of a parking lever (not shown).

The conventional parking brake system operates as follows. When the driver operates the parking lever, the cable 16 is pulled so that the rotatable lever 8 rotates about the hinge pin 7 toward the cable pulling direction. Therefore, the adjuster 9 pushes the other brake shoe 3 toward the bore surface of the drum 1 in the direction indicated by the arrow shown in FIG. 1. At this time, the brake shoe 3 and the rotatable lever 8 move to the bore surface of the drum 1. In this manner, the brake is applied in the form of a parking brake.

Such conventional brake systems suffer from a number of problems. For example, the structure is complicated since the rotatable lever 8 and adjuster 9 must be added to the main brake system. Also, the system is expensive to manufacture, and has a low assembling performance.

SUMMARY OF THE INVENTION

Accordingly, it is an object of the present invention to provide an improved brake system having a parking brake function which eliminates the above problems encountered with conventional brake systems.

Another object of the present invention is to provide a brake system having an improved wheel cylinder, compared with a convention wheel cylinder, for performing a parking brake function whereby the brake system is simple in structure, is inexpensive to manufacture, and has a small volume.

Still another object of the present invention is to provide a brake system for a vehicle, which is simple in structure, is inexpensive to manufacture, and is durable.

These and other objects of the invention are achieved by a brake system comprising, a pair of brake shoes; and a wheel cylinder actuating said brake shoes such that said brake shoes contact a drum to apply braking action thereto, said wheel cylinder including, a housing; a first pair of oppositely facing pistons disposed within said housing; a second pair of oppositely facing pistons disposed within said housing between said first pair of oppositely facing pistons; and a member disposed between and in contact with said second pair of oppositely facing pistons, in a first position said member providing a first separation distance between said second pair of oppositely facing pistons, and in a second position said member providing a second separation distance between said second pair of oppositely facing pistons, said second separation distance being different from said first separation distance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
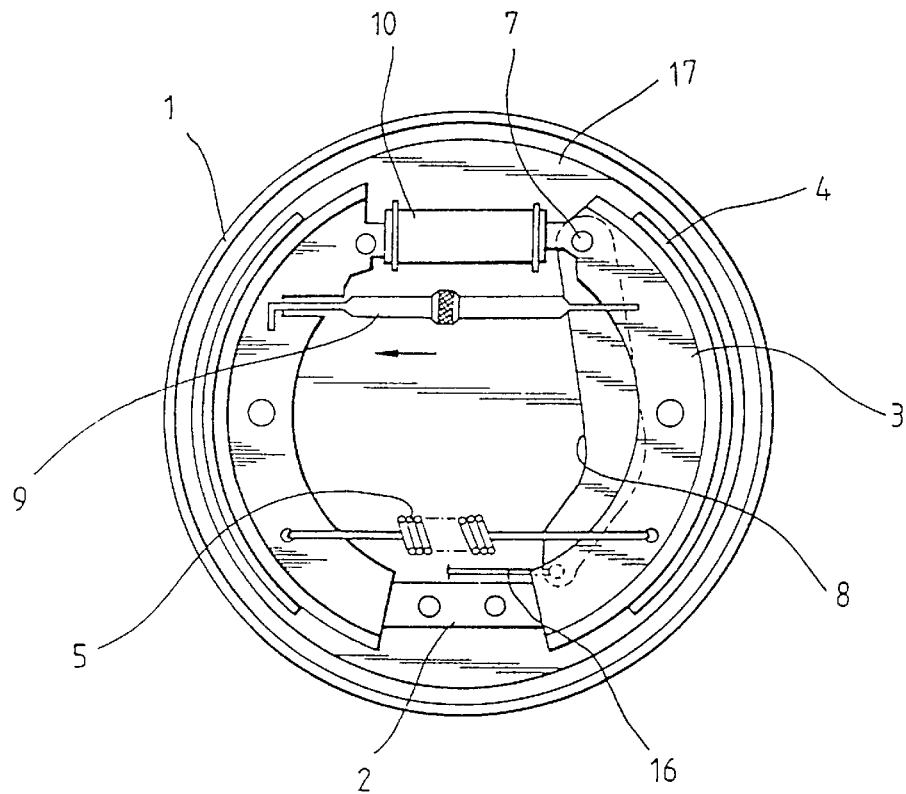
FIG. 1 is a top plane view of a conventional brake system for a vehicle.
Figure 2:
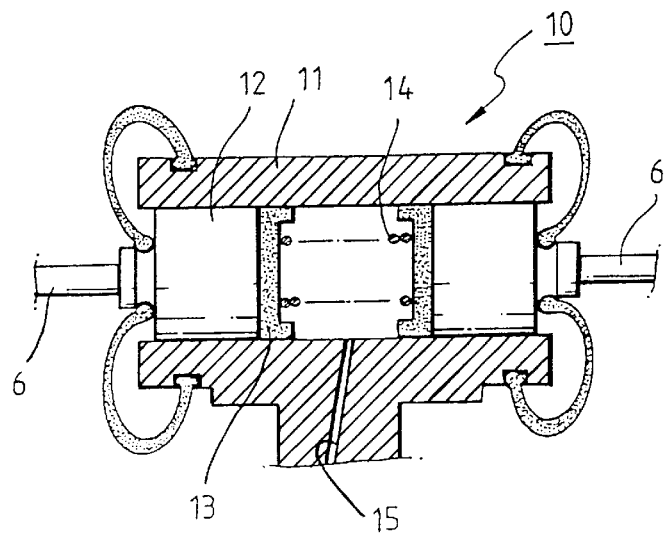
FIG. 2 is a sectional view of a wheel cylinder of the conventional brake system for a vehicle.
Figure 3:
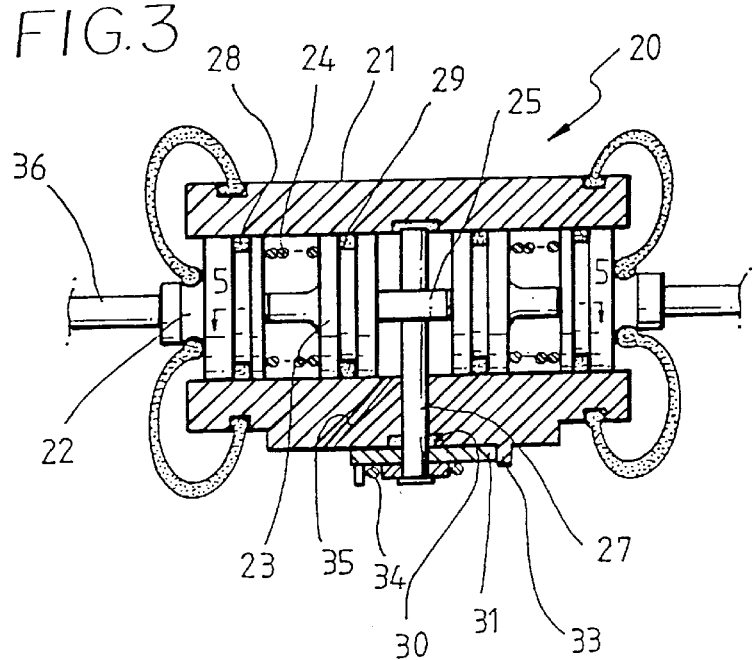
FIG. 3 is a sectional view of a wheel cylinder in a friction brake system for a vehicle according to the present invention.
Figure 4:
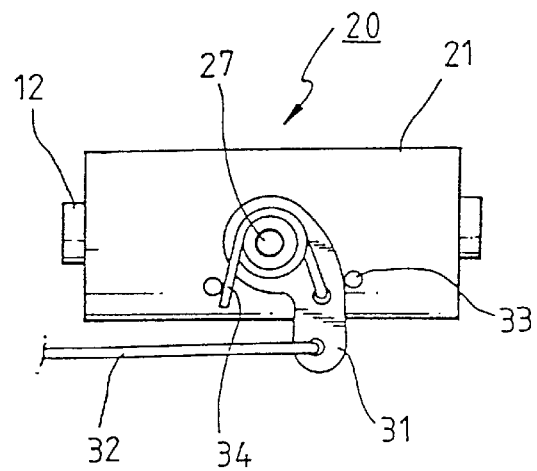
FIG. 4 is a front elevational view of a wheel cylinder in the friction brake system for a vehicle according to the present invention.

Referring now in detail to the drawings for the purpose of illustrating preferred embodiments of the present invention, the friction brake system for a vehicle includes a drum 1, a pair of brake shoes 3, and a brake lining 4 as shown in FIG. 1. The brake system further includes a wheel cylinder 20 having a housing 21 as shown in FIGS. 3 and 4. The housing 21 includes a pair of first pistons 22 disposed therein a predetermined distance from each other to permit reciprocation. A pair of second pistons 23 are disposed within the pair of first pistons 22, and are provided with a return spring 24 located between each first piston 22 and second piston 23.

Figure 5:
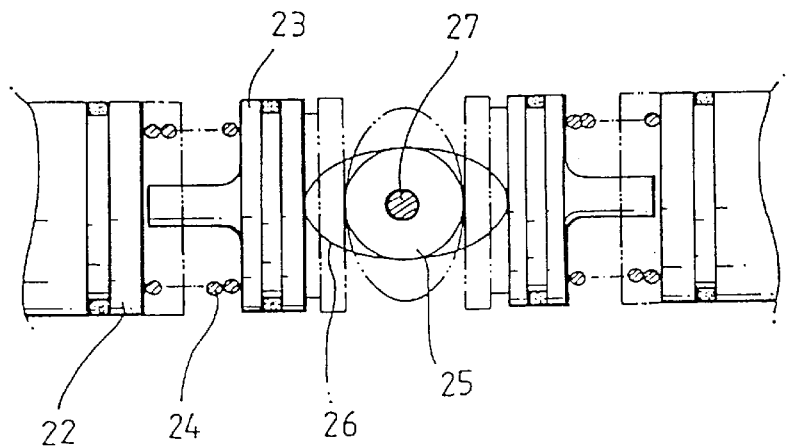
FIG. 5 is a sectional view of FIG. 3, taken along line 5—5.

As shown in FIGS. 3 and 5, a cam 25 is positioned between the pair of second pistons 23 and a cam surface 26 of the cam 25 contacts oppositely facing surfaces of the pair of second pistons 23. As shown in FIG. 5, the cam 25 has a generally elliptical shape with a minor and major axis. The cam 25 rotates about a shaft 27 (FIG. 5). One end of the shaft 27 supports the cam 25 inside the housing 21 and other end of the shaft 27 extends outside the housing 21. There are seals 28, 29, and 30 disposed between the inner surface of the housing 21 and (1) the pair of first pistons 22, (2) the pair of second pistons 23 and (3) the shaft 27 for maintaining airtightness.

The other end of the shaft 27 is connected to a lever 31. The lever 31 is connected to a parking lever (not shown) via a cable 32; whereby upon operating the parking lever, the lever 31 rotates. The angle of rotation of the lever 31, however, is limited by a stopper 33, and a maximum permissible rotation angle is 90°. The other end of the shaft 27 is further connected to a torsion spring 34 for returning the lever 31 to its original position (FIG. 4).

The friction brake system according to the present invention operates as follows. During driving, when the driver pushes the brake pedal, oil enters between the second pistons 23 in the housing 31 via an orifice 35, so that the second pistons 23 move outward in opposite directions. Therefore, the return springs 24 compress by a predetermined amount and push the pistons 22 which in turn push push rods 36 respectively connected to the brake shoes 3. As shown in FIG. 5 a small gap exists between the heads and the first pistons 22 and the shaft of the second pistons 23 allowing the return springs 24 to compress. The brake shoes 3 (FIG. 1) rotate, and the brake linings 4 contact the bore surface of the drum 1 to provide braking action. When the user releases the brake pedal, the oil in the wheel cylinder drains out, and the second pistons 23 return to their original position. Therefore, the braking action is released.

When the driver parks or stops the vehicle and operates the parking lever, the lever 31 is pulled by the cable 32 since the cable 32 is connected to the parking lever and the lever 31. Therefore, the lever 31 rotates in the clockwise direction as shown in FIG. 5. Responsive to the rotation of the lever 31, the cam 25 connected to the shaft 27 rotates from a first position shown by a dotted line in FIG. 5 to a second position shown by a solid line in FIG. 5. In the first position, the minor axis of the cam 25 is perpendicular to the oppositely facing surfaces of the second pistons 23. In the second position, the longer, major axis of the cam 25 is perpendicular to the oppositely facing surfaces of the cam 25. By rotating the cam 25 from the first position to the second position, the cam 25 pushes both second pistons 23, and moves the second pistons 23.

The second pistons 23 move outwardly by a predetermined amount and push the first pistons 22 which move outwardly and push the push rods 36. Therefore, the brake shoes 3 operate and apply braking action. If the user returns the parking lever to its original position (i.e., releases the parking lever), the lever 31 is returned to its original position by the torsion spring 34. Consequently, the cam 25 rotates from the second position to the first position disengaging the brake shoes 3 from contact with drum 1.

Accordingly, the friction brake system according to the present invention includes a wheel cylinder containing the second pistons 23 and the cam 25 therein; whereby the brake system of the present invention has dual functions, a braking function and a parking brake function. Additionally, the brake system of the present invention is simple in structure, inexpensive to manufacture, and has effective assembling performance (small volume).

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A brake system, comprising:

a pair of brake shoes; and a wheel cylinder actuating said brake shoes such that said brake shoes contact a drum to apply braking action thereto, said wheel cylinder including, a housing;

a first pair of oppositely facing pistons disposed within said housing;

a second pair of oppositely facing pistons disposed within said housing between said first pair of oppositely facing pistons;

a member disposed between and in contact with said second pair of oppositely facing pistons, in a first position said member providing a first separation distance between said second pair of oppositely facing pistons, and in a second position said member providing a second separation distance between said second pair of oppositely facing pistons, said second separation distance being different from said first separation distance; and return springs disposed between each one of said first pair of oppositely facing pistons and a corresponding one of said second pair of oppositely facing pistons.

2. The brake system of claim 1, further comprising:

a shaft having a first and second end, said first end connected to said member, and said second end extending outside said housing;

a lever connected to said second end of said shaft.

3. The brake system of claim 2, wherein said lever is moved between a first lever position and a second lever position, said member being in said first position when said lever is in said first lever position, and said member being in said second position when said lever is in said second lever position.

4. The brake system of claim 3, further comprising:

spring means for urging said lever from said second lever position towards said first lever position.

5. The brake system of claim 4, further comprising:

stopper means for preventing said spring means from moving said lever beyond said first lever position.

6. The brake system of claim 1, wherein said second pair of oppositely facing pistons have oppositely facing surfaces; and said member is a cam having a first axis and a second axis, said second axis being longer than said first axis, said cam being disposed such that said first axis is perpendicular to said oppositely facing surfaces in said first position, and said cam being disposed such that said second axis is perpendicular to said oppositely facing surfaces in said second position.

7. The brake system of claim 6, wherein said cam has an elliptical shape.

8. The brake system of claim 6, wherein said cam rotates between said first position and said second position.

9. The brake system of claim 1, further comprising:
   push rods connecting said first pair of pistons to said brake shoes.

10. The brake system of claim 1, wherein said housing has an orifice connecting an exterior of said housing to a space inside said housing between said second pair of pistons.

11. The brake system of claim 1, wherein said member rotates between said first position and said second position.

* * * * *